(12) United States Patent
Schertiger et al.

(10) Patent No.: US 12,485,033 B2
(45) Date of Patent: *Dec. 2, 2025

(54) DEVICE FOR CONNECTING A BASE PLATE AND/OR A SENSOR PATCH FOR A MEDICAL DEVICE

(71) Applicant: Coloplast A/S, Humlebaek (DK)

(72) Inventors: Lars Olav Schertiger, Fredensborg (DK); Stephanie Knoedler, Nivaa (DK)

(73) Assignee: Coloplast A/S, Humlebaek (DK)

( * ) Notice: Subject to any disclaimer, the term of this patent is extended or adjusted under 35 U.S.C. 154(b) by 492 days.

This patent is subject to a terminal disclaimer.

(21) Appl. No.: 17/620,124

(22) PCT Filed: Jun. 25, 2020

(86) PCT No.: PCT/DK2020/050196
§ 371 (c)(1),
(2) Date: Dec. 17, 2021

(87) PCT Pub. No.: WO2020/259786
PCT Pub. Date: Dec. 30, 2020

(65) Prior Publication Data
US 2022/0313473 A1    Oct. 6, 2022

(30) Foreign Application Priority Data
Jun. 26, 2019    (DK) .......................... PA 2019 70406

(51) Int. Cl.
*A61F 5/44*    (2006.01)
*A61F 5/443*    (2006.01)

(52) U.S. Cl.
CPC ............ *A61F 5/4404* (2013.01); *A61F 5/443* (2013.01)

(58) Field of Classification Search
CPC ......... A61F 5/4404; A61F 5/443; A61F 5/445
See application file for complete search history.

(56) References Cited

U.S. PATENT DOCUMENTS 4,719,919  A  *  1/1988  Marchosky ............... A61F 7/12
                                                607/113
4,964,807  A  *  10/1990  Draus .................... H01R 11/24
                                                439/825

(Continued)

FOREIGN PATENT DOCUMENTS

CN       109785591 A  *  5/2019
DE       3836590 A1       5/1990

(Continued)

*Primary Examiner* — Rebecca E Eisenberg
*Assistant Examiner* — Ted Yang
(74) *Attorney, Agent, or Firm* — Coloplast Corp., Coloplast A/S; Nick Baumann

(57) ABSTRACT

A monitor device for connecting to a sensor patch of an ostomy appliance includes a housing, electronic circuitry, a first interface for collecting sensor data from the sensor patch, and a tail portion having a proximal end and a distal end. The tail portion has an electrode extending from the proximal end of the tail portion to a first coupling element on the distal end. The monitor device is adapted to couple mechanically and electrically to the sensor patch of the ostomy appliance for relaying signals from the sensor patch to the monitor device.

23 Claims, 6 Drawing Sheets

(56) References Cited

U.S. PATENT DOCUMENTS

| | | | | |
|---|---|---|---|---|
| 5,197,895 A * | 3/1993 | Stupecky | ............... | A61B 5/087 604/905 |
| 5,260,692 A | 11/1993 | Claren | | |
| 5,404,876 A * | 4/1995 | DiSabito | ............. | A61B 5/4362 600/376 |
| 5,454,739 A * | 10/1995 | Strand | ................... | A61B 5/274 600/372 |
| 5,469,845 A * | 11/1995 | DeLonzor | ......... | A61B 5/02427 600/386 |
| 5,624,281 A * | 4/1997 | Christensson | ......... | A61B 5/274 439/729 |
| 6,062,915 A * | 5/2000 | Costello | ................ | H01R 11/24 439/729 |
| 6,152,754 A * | 11/2000 | Gerhardt | ............ | H01R 13/5224 439/948 |
| 6,171,289 B1 * | 1/2001 | Millot | ..................... | A61F 5/443 604/336 |
| 6,573,837 B2 * | 6/2003 | Bluteau | ................... | A61F 13/42 340/573.5 |
| 6,696,964 B1 * | 2/2004 | Håkansson | ............. | A61F 5/445 338/80 |
| 7,394,391 B2 * | 7/2008 | Long | ....................... | A61F 13/42 340/573.5 |
| 7,548,771 B2 * | 6/2009 | Mannheimer | ........ | A61B 5/6838 600/323 |
| 7,595,734 B2 * | 9/2009 | Long | ....................... | A61F 13/42 340/573.5 |
| 7,737,321 B2 | 6/2010 | Elliott | | |
| 8,304,598 B2 * | 11/2012 | Mosbacher | ............. | A61F 13/42 604/385.01 |
| 8,431,766 B1 | 4/2013 | Lonero | ................... | A61F 13/42 604/361 |
| 9,610,059 B2 * | 4/2017 | Christensen | ....... | A61B 5/02028 |
| 9,629,952 B2 * | 4/2017 | Heppe | ................. | A61M 1/3656 |
| 10,022,075 B2 | 7/2018 | Hamaguchi et al. | | |
| 10,146,911 B2 | 12/2018 | Trock | | |
| 11,090,001 B2 * | 8/2021 | Stevens | ................. | A61B 5/202 |
| 11,179,074 B1 * | 11/2021 | Lash | .................... | A61B 5/0084 |
| 11,590,015 B2 * | 2/2023 | Hansen | .................. | A61F 5/443 |
| 11,607,334 B2 * | 3/2023 | Hansen | .................. | A61F 5/4404 |
| 11,612,508 B2 * | 3/2023 | Hansen | .................. | A61F 5/4404 604/336 |
| 2005/0065488 A1 * | 3/2005 | Elliott | ..................... | A61F 5/445 604/361 |
| 2006/0047215 A1 * | 3/2006 | Newman | ................ | A61B 5/282 600/528 |
| 2009/0157026 A1 * | 6/2009 | Elliott | ..................... | A61F 5/445 604/361 |
| 2010/0030167 A1 * | 2/2010 | Thirstrup | .............. | A61F 5/4404 340/657 |
| 2010/0271212 A1 * | 10/2010 | Page | ....................... | A61F 13/42 340/573.1 |
| 2012/0139734 A1 * | 6/2012 | Olde | ...................... | H01R 11/22 600/372 |
| 2013/0072870 A1 * | 3/2013 | Heppe | ................. | A61M 1/3653 604/6.16 |
| 2013/0303020 A1 * | 11/2013 | Sabin | ..................... | H01R 43/26 29/874 |
| 2015/0250639 A1 * | 9/2015 | Thirstrup | .......... | A61F 13/00051 156/278 |
| 2015/0257923 A1 * | 9/2015 | Thirstrup | ................ | A61F 13/42 604/318 |
| 2016/0166203 A1 * | 6/2016 | Goldstein | .......... | A61B 5/02055 600/509 |
| 2017/0340474 A1 * | 11/2017 | Thirstrup | ............... | A61B 5/746 |
| 2017/0360592 A1 * | 12/2017 | Carrubba | ................ | A61F 5/445 |
| 2018/0036199 A1 * | 2/2018 | Bougatef | .......... | A61M 16/0858 |
| 2018/0087193 A1 * | 3/2018 | Fu | .......................... | A61B 5/742 |
| 2018/0168508 A1 * | 6/2018 | Biel | ....................... | A61B 5/282 |
| 2018/0249919 A1 * | 9/2018 | Pont | ................... | A61B 5/14552 |
| 2019/0132948 A1 * | 5/2019 | Longinotti-Buitoni | ...................... | A61B 5/6805 |
| 2019/0133812 A1 * | 5/2019 | Seres | .................... | A61F 5/4404 |
| 2019/0142623 A1 | 5/2019 | Schoess et al. | | |
| 2019/0260155 A1 * | 8/2019 | Good | ................. | H01R 13/5227 |
| 2020/0105440 A1 * | 4/2020 | Mahajan, Jr. | ........ | H01B 7/0225 |
| 2020/0143657 A1 * | 5/2020 | Humphrey | ............. | G16H 80/00 |
| 2020/0337880 A1 * | 10/2020 | Hansen | .................. | A61F 5/443 |
| 2020/0390589 A1 * | 12/2020 | Hansen | .................. | A61F 5/443 |
| 2021/0121116 A1 * | 4/2021 | Kreuzer | ................... | A61B 5/01 |
| 2022/0000652 A1 * | 1/2022 | Thirstrup | ................ | A61F 5/445 |
| 2023/0190509 A1 * | 6/2023 | Hansen | .................. | A61F 5/443 604/336 |

FOREIGN PATENT DOCUMENTS

| | | | | |
|---|---|---|---|---|
| DE | 102009008885 A1 * | 8/2010 | .......... | A61M 1/3653 |
| EP | 0810847 B1 | 8/2000 | | |
| EP | 1991187 B1 | 10/2018 | | |
| EP | 3028025 B1 | 4/2019 | | |
| EP | 4042985 A1 | 8/2022 | | |
| NL | 9500338 A * | 10/1996 | ............. | A61F 13/42 |
| WO | 2007098762 A1 | 9/2007 | | |
| WO | WO-2011139499 A1 * | 11/2011 | ............. | A61F 5/445 |
| WO | 2017158428 A1 | 9/2017 | | |
| WO | 2018162728 A2 | 9/2018 | | |
| WO | 2018162736 A1 | 9/2018 | | |
| WO | WO-2019058002 A1 * | 3/2019 | ............. | A61F 13/42 |
| WO | 2019094635 A1 | 5/2019 | | |
| WO | 2019120437 A1 | 6/2019 | | |

* cited by examiner

DEVICE FOR CONNECTING A BASE PLATE AND/OR A SENSOR PATCH FOR A MEDICAL DEVICE

The present disclosure relates to an ostomy system and devices thereof, such as a monitor device for connecting to a sensor patch of an ostomy appliance, the monitor device comprising; a housing; an electronic circuitry; a first interface configured for collecting sensor data from the sensor patch. The ostomy appliance system comprises an ostomy appliance and an ostomy monitor device. In particular, the present disclosure relates to leakage classification and/or detection and monitoring of the operation of an ostomy appliance.

BRIEF DESCRIPTION OF THE DRAWINGS

The accompanying drawings are included to provide a further understanding of embodiments and are incorporated into and a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
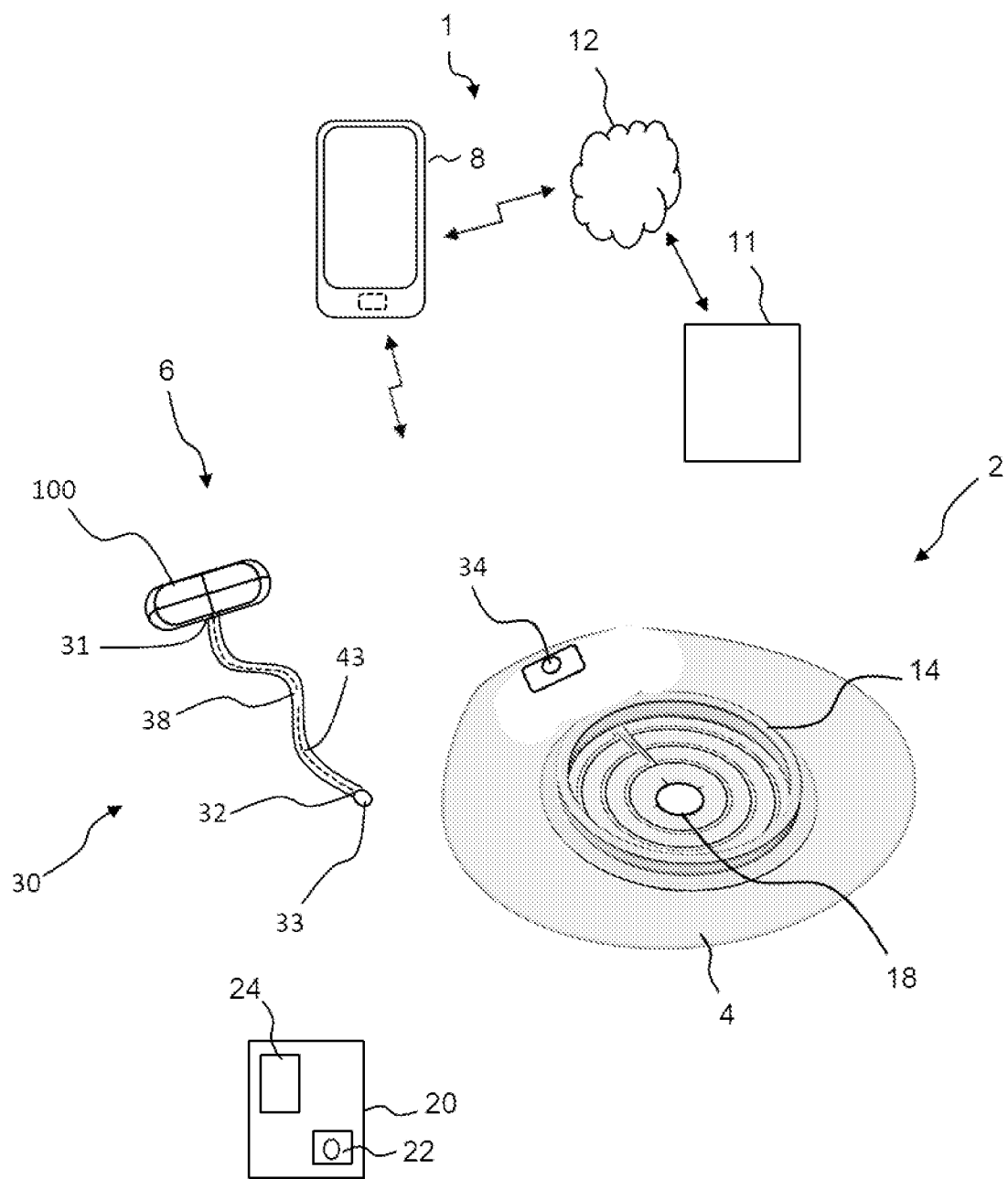
FIG. 1 illustrates an exemplary ostomy system.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout this disclosure, the words "stoma" and "ostomy" are used to denote a surgically created opening bypassing the intestines or urinary tract system of a person. The words are used interchangeably, and no differentiated meaning is intended. The same applies for any words or phrases derived from these, e.g. "stomal", "ostomies" etc. Also, the solid and liquid wastes emanating from the stoma may be referred to as both stomal "output," "waste(s)," and "fluids" interchangeably. A subject having undergone ostomy surgery may be referred to as "ostomist" or "ostomate"—moreover, also as "patient" or "user". However, in some cases "user" may also relate or refer to a health care professional (HCP), such as a surgeon or an ostomy care nurse or others. In those cases, it will either be explicitly stated, or be implicit from the context that the "user" is not the "patient" him- or herself.

In the following, whenever referring to proximal side or surface of a layer, an element, a device or part of a device, the referral is to the skin-facing side or surface, when a user wears the ostomy appliance. Likewise, whenever referring to the distal side or surface of a layer, an element, a device or part of a device, the referral is to the side or surface facing away from the skin, when a user wears the ostomy appliance. In other words, the proximal side or surface is the side or surface closest to the user, when the appliance is fitted on a user and the distal side is the opposite side or surface—the side or surface furthest away from the user in use.

The axial direction is defined as the direction of the stoma, when a user wears the appliance. Thus, the axial direction is generally perpendicular to the skin or abdominal surface of the user.

The radial direction is defined as perpendicular to the axial direction. In some sentences, the words "inner" and "outer" may be used. These qualifiers should generally be perceived with respect to the radial direction, such that a reference to an "outer" element means that the element is farther away from a centre portion of the ostomy appliance than an element referenced as "inner". In addition, "innermost" should be interpreted as the portion of a component forming a centre of the component and/or being adjacent to the centre of the component. In analogy, "outermost" should be interpreted as a portion of a component forming an outer edge or outer contour of a component and/or being adjacent to that outer edge or outer contour.

The use of the word "substantially" as a qualifier to certain features or effects in this disclosure is intended to simply mean that any deviations are within tolerances that would normally be expected by the skilled person in the relevant field.

The use of the word "generally" as a qualifier to certain features or effects in this disclosure is intended to simply mean—for a structural feature: that a majority or major portion of such feature exhibits the characteristic in question, and—for a functional feature or an effect: that a majority of outcomes involving the characteristic provide the effect, but that exceptionally outcomes do no provide the effect.

The use of the word "connected" is to be understood as two elements being connected, attached, fixed or coupled together, e.g. a connection can be a fixed or releasable mechanical coupling and/or a wired connection forming an electrical connection.

The present disclosure relates to an ostomy system and devices thereof, such as a monitor device for connecting to a sensor patch of an ostomy appliance, an ostomy appliance, a base plate for an ostomy appliance and optionally one or more accessory devices. An accessory device (also referred to as an external device) may be a mobile phone or other handheld device. An accessory device may be a personal electronic device, e.g. a wearable, such as a watch or other wrist-worn electronic device. An accessory device may be a docking station. The docking station may be configured to electrically and/or mechanically couple the monitor device to the docking station. The docking station may be configured for charging the monitor device and/or configured for transferring data between the monitor device and the docking station. The ostomy system may comprise a server device. The server device may be operated and/or controlled by the ostomy appliance manufacturer and/or a service centre.

The present disclosure provides an ostomy system and devices thereof, such as an ostomy appliance, a base plate for an ostomy appliance, a monitor device, and optionally one or more accessory devices which either alone or together facilitate reliable determination of the nature, severity and rapidness of moisture propagation in the adhesive material provided for attaching the base plate to the skin surface of a user. Depending on the nature of the pattern of moisture propagation in the adhesive, the ostomy system and devices thereof enable providing information to the user about the type of failure, and in turn enable providing an indication to the user of the severity and thus the remaining time frame for replacing the ostomy appliance without experiencing severe leakage and/or skin damage.

The ostomy appliance comprises a base plate and an ostomy pouch (also referred to as an ostomy bag). The ostomy appliance may be a colostomy appliance, an ileostomy appliance or a urostomy appliance. The ostomy appliance may be a two-part ostomy appliance, i.e. the base plate and the ostomy pouch may be releasably coupled e.g. with a mechanical and/or an adhesive coupling, e.g. to allow that a plurality of ostomy pouches can be utilized (exchanged) with one base plate. Further, a two-part ostomy appliance may facilitate correct application of the base plate to skin, e.g. to an improved user sight of the stomal region. The ostomy appliance may be a one-part ostomy appliance, i.e. the base plate and the ostomy pouch may be fixedly attached to each other. The base plate is configured for coupling to a user's stoma and/or skin surrounding the stoma, such as a peristomal skin area.

The ostomy appliance includes a base plate, such as a monolithic, one-piece base plate, e.g. integrated with a sensor patch, or a base plate and a separate sensor patch, such as a sensor patch to be subsequently applied to a base plate. For example, to allow an arbitrary base plate, such as a conventional base plate, to achieve the features as described herein. Features as described with respect to the base plate herein may be provided by a sensor patch to be applied to a base plate, e.g. by the user. A sensor patch may be adapted to adhere to an ostomy plate.

A disclosed method of attaching a base plate to a user's stoma and/or skin surrounding the stoma, such as the peristomal skin area, may comprise attaching a sensor patch to a base plate and attaching the base plate, e.g. together with the attached sensor patch, to the user's stoma and/or skin surrounding the stoma, such as the peristomal skin area. Alternatively, the method of attaching the base plate to the user's stoma and/or skin surrounding the stoma may comprise attaching the sensor patch to the user's stoma and/or skin surrounding the stoma and attaching the base plate to the user's stoma and/or skin surrounding the stoma above the attached sensor patch.

The base plate and/or the sensor patch may comprise a first adhesive layer, also denoted centre adhesive layer. During use, the first adhesive layer adheres to the user's skin (peristomal area) and/or to additional seals, such as sealing paste, sealing tape and/or sealing ring. Thus, the first adhesive layer may be configured for attachment of the base plate and/or the sensor patch to the skin surface of a user. The first adhesive layer may have a stomal opening, such as a first adhesive stomal opening, with a centre point.

The first adhesive layer may be made of a first composition. The first composition may comprise one or more polyisobutenes and/or styrene-isoprene-styrene. The first composition may comprise one or more hydrocolloids. The first composition may comprise one or more water soluble or water swellable hydrocolloids.

The first composition may be a pressure sensitive adhesive composition suitable for medical purposes comprising a rubbery elastomeric base and one or more water soluble or water swellable hydrocolloids. The first composition may comprise one or more polybutenes, one or more styrene copolymers, one or more hydrocolloids, or any combination thereof. The combination of the adhesive properties of the polybutenes and the absorbing properties of the hydrocolloids renders the first composition suitable for use in ostomy appliances. The styrene copolymer may for example be a styrene-butadiene-styrene block copolymer or a styrene-isoprene-styrene block copolymer. Preferably, one or more styrene-isoprene-styrene (SIS) block type copolymers are employed. The amount of styrene block-copolymer may be from 5% to 20% of the total adhesive composition. The butene component is suitably a conjugated butadiene polymer selected from polybutadiene, polyisoprene. The polybutenes are preferably present in an amount of from 35-50% of the total adhesive composition. Preferably, the polybutene is polyisobutylene (PIB). Suitable hydrocolloids for incorporation in the first composition are selected from naturally occurring hydrocolloids, semisynthetic hydrocolloids and synthetic hydrocolloids. The first composition may comprise 20-60% hydrocolloids. A preferred hydrocolloid is carboxymethylcellulose (CMC). The first composition may optionally contain other components, such as fillers, tackifiers, plasticizers, and other additives.

The first adhesive layer may have a plurality of sensor point openings. A sensor point opening of the first adhesive layer is optionally configured to overlap a part of an electrode, e.g. to form a sensor point.

The first adhesive layer may have a substantially uniform thickness. The first adhesive layer may have a thickness in the range from 0.1 mm to 1.5 mm, e.g. in the range from 0.2 mm to 1.2 mm.

The first adhesive layer may have a primary thickness in a primary part of the first adhesive layer, e.g. in a primary region within a primary radial distance or in a primary radial distance range from the centre point of the stomal opening. The primary thickness may be in the range from 0.2 mm to 1.5 mm. such as about 1.0 mm. The primary radial distance may be in the range from 20 mm to 50 mm, such as in the range from 25 mm to 35 mm, e.g. 30 mm.

The first adhesive layer may have a secondary thickness in a secondary part of the first adhesive layer, e.g. in a secondary region outside a secondary radial distance or in a secondary radial distance range from the centre point of the stomal opening. The secondary thickness may be in the range from 0.2 mm to 1.0 mm, such as about 0.5 mm. The secondary radial distance may be in the range from 20 mm to 50 mm, such as in the range from 25 mm to 35 mm, e.g. 30 mm.

The base plate and/or the sensor patch may comprise a second layer. The second layer may be a second adhesive layer, also denoted rim adhesive layer. The second layer may have a second radial extension that is larger than a first radial extension of the first adhesive layer at least in a first angular range of the base plate and/or the sensor patch. Accordingly, a part of a proximal surface of the second layer may be configured for attachment to the skin surface of a user. The part of a proximal surface of the second layer configured for attachment to the skin surface of a user is also denoted the skin attachment surface of the second adhesive layer. The second layer may have a stomal opening, such as a second layer stomal opening and/or a second adhesive stomal opening, with a centre point.

The second adhesive layer may be made of a second composition. The second composition may comprise one or more polyisobutenes and/or styrene-isoprene-styrene. The second composition may comprise one or more hydrocolloids. The second composition may comprise one or more water soluble or water swellable hydrocolloids.

The second composition may be a pressure sensitive adhesive composition suitable for medical purposes comprising a rubbery elastomeric base and one or more water soluble or water swellable hydrocolloids. The second composition may comprise one or more polybutenes, one or more styrene copolymers, one or more hydrocolloids, or any combination thereof. The combination of the adhesive properties of the polybutenes and the absorbing properties of the hydrocolloids renders the second composition suitable for use in ostomy appliances. The styrene copolymer may for example be a styrene-butadiene-styrene block copolymer or a styrene-isoprene-styrene block copolymer. Preferably, one or more styrene-isoprene-styrene (SIS) block type copolymers are employed. The amount of styrene block-copolymer may be from 5% to 20% of the total adhesive composition. The butene component is suitably a conjugated butadiene polymer selected from polybutadiene, polyisoprene. The polybutenes are preferably present in an amount of from 35-50% of the total adhesive composition. Preferably, the polybutene is polyisobutylene (PIB). Suitable hydrocolloids for incorporation in the second composition are selected from naturally occurring hydrocolloids, semisynthetic hydrocolloids and synthetic hydrocolloids. The second composition may comprise 20-60% hydrocolloids. A preferred hydrocolloid is carboxymethylcellulose (CMC). The second composition may optionally contain other components, such as fillers, tackifiers, plasticizers, and other additives.

Different ratio of contents may change properties of the first and/or second adhesive layers. The second adhesive layer and the first adhesive layer may have different properties. The second adhesive layer (second composition) and the first adhesive layer (first composition) may have different ratios of polyisobutenes, styrene-isoprene-styrene, and/or hydrocolloids. For example, the second adhesive layer may provide a stronger attachment to the skin compared to attachment to the skin provided by the first adhesive layer. Alternatively or additionally, the second adhesive layer may be thinner than the first adhesive layer. Alternatively or additionally, the second adhesive layer may be less water and/or sweat absorbing than the first adhesive layer. Alternatively or additionally, the second adhesive layer may be less mouldable than the first adhesive layer. The second adhesive layer may provide a second barrier against leakage.

The second layer may have a substantially uniform thickness. The second layer may have a thickness in the range from 0.1 mm to 1.5 mm, e.g. in the range from 0.2 mm to 1.0 mm, such as 0.5 mm, 0.6 mm, or 0.7 mm.

The base plate and/or the sensor patch may comprise one or more electrodes, such as a plurality of electrodes, such as two, three, four, five, six, seven or more electrodes. The sensor patch may be applied to the base plate, such as to provide the base plate with the one or more electrodes.

The electrodes, e.g. some or all the electrodes, may be arranged between the first adhesive layer and the second adhesive layer. The electrodes may be arranged in an electrode assembly, e.g. an electrode layer. An electrode comprises a connection part for connecting the electrodes to other components and/or interface terminals. An electrode may comprise one or more conductor parts and/or one or more sensing parts. The electrode assembly may be arranged between the first adhesive layer and the second adhesive layer. The base plate and/or the sensor patch, e.g. the electrode assembly, may comprise a first electrode, a second electrode and optionally a third electrode. The base plate and/or the sensor patch, e.g. the electrode assembly, may comprise a fourth electrode and/or a fifth electrode. The base plate and/or the sensor patch, e.g. the electrode assembly, optionally comprises a sixth electrode. The base plate and/or the sensor patch, e.g. the electrode assembly, may comprise a ground electrode. The ground electrode may comprise a first electrode part. The first electrode part of the ground electrode may form a ground for the first electrode. The ground electrode may comprise a second electrode part. The second electrode part of the ground electrode may form a ground for the second electrode. The ground electrode may comprise a third electrode part. The third electrode part of the ground electrode may form a ground for the third electrode. The ground electrode may comprise a fourth electrode part. The fourth electrode part of the ground electrode may form a ground for the fourth electrode and/or the fifth electrode.

The ground electrode or electrode parts of the ground electrode may be configured as or form a (common) reference electrode for some or all of the other electrodes of the electrode assembly. The ground electrode may also be denoted reference electrode.

The electrodes are electrically conductive and may comprise one or more of metallic (e.g. silver, copper, gold, titanium, aluminium, stainless steel), ceramic (e.g. ITO), polymeric (e.g. PEDOT, PANI, PPy), and carbonaceous (e.g. carbon black, carbon nanotube, carbon fibre, graphene, graphite) materials.

Two electrodes of the electrode assembly may form a sensor. The first electrode and the ground electrode (e.g. first electrode part of the ground electrode) may form a first sensor or first electrode pair. The second electrode and the ground electrode (e.g. second electrode part of the ground electrode) may form a second sensor or second electrode pair. The third electrode and the ground electrode (e.g. third electrode part of the ground electrode) may form a third sensor or third electrode pair. The fourth electrode and the ground electrode (e.g. fourth electrode part of the ground electrode) may form a fourth sensor or fourth electrode pair. The fifth electrode and the ground electrode (e.g. fifth electrode part of the ground electrode) may form a fifth sensor or fifth electrode pair.

In general, by use of multiplexing one electrode may relay a signal to the monitor device.

The first electrode may form an open loop. The second electrode may form an open loop and/or the third electrode may form an open loop. The fourth electrode may form an open loop. The fifth electrode may form an open loop. Open loop electrode(s) enables electrode arrangement in few or a single electrode layer.

The electrode assembly may comprise a support layer, also denoted a support film. One or more electrodes may be formed, e.g. printed, on the proximal side of the support layer. One or more electrodes may be formed, e.g. printed, on the distal side of the support layer. The electrode assembly, such as the support layer of the electrode assembly, may have a stomal opening, such as an electrode assembly stomal opening and/or a support layer stomal opening, with a centre point.

The support layer may comprise polymeric (e.g. polyurethane, PTFE, PVDF) and/or ceramic (e.g. alumina, silica) materials. In one or more exemplary base plates and/or sensor patches, the support layer is made of thermoplastic polyurethane (TPU). The support layer material may be made of or comprise one or more of polyester, a thermoplastic elastomer (TPE), polyimide, polyimide, Ethylene-vinyl acetate (EVA), polyurea, and silicones.

Exemplary thermoplastic elastomers of the support layer are styrenic block copolymers (TPS, TPE-s), thermoplastic polyolefinelastomers (TPO, TPE-o), thermoplastic Vulcanizates (TPV, TPE-v), thermoplastic polyurethanes (TPU), thermoplastic copolyester (TPC, TPE-E), and thermoplastic polyamides (TPA, TPE-A).

The base plate and/or the sensor patch, such as the electrode assembly may comprise a masking element configured to insulate at least parts of the electrodes from the first adhesive layer of the base plate and/or the sensor patch. The masking element may comprise one or more, such as a plurality of, sensor point openings. The sensor point openings may comprise primary sensor point openings and/or secondary sensor point openings. The sensor point openings may comprise tertiary sensor point opening(s). The sensor point openings may comprise quaternary sensor point opening(s) A sensor point opening of the masking element overlaps at least one electrode of the electrode assembly when seen in the axial direction, e.g. to form a sensor point. For example, a primary sensor point opening may overlap a part of the ground electrode and/or a part of the fourth electrode. A secondary sensor point opening may overlap a part of the fourth electrode and/or a part of the fifth electrode. A tertiary sensor point opening may overlap a part of the fifth electrode and/or a part of the ground electrode.

The masking element may comprise one or more, such as a plurality of, terminal openings. The masking element may comprise polymeric (e.g. polyurethane, PTFE, PVDF) and/or ceramic (e.g. alumina, silica) materials. In one or more exemplary base plates and/or sensor patches, the masking element is made of or comprises thermoplastic polyurethane (TPU). In one or more exemplary base plates and/or sensor patches, the masking element is made of or comprises polyester. The masking element material may be made of or comprise one or more of polyester, a thermoplastic elastomer (TPE), polyamide, polyimide, Ethylene-vinyl acetate (EVA), polyurea, and silicones.

Exemplary thermoplastic elastomers of the masking element are styrenic block copolymers (TPS, TPE-s), thermoplastic polyolefinelastomers (TPO, TPE-o), thermoplastic Vulcanizates (TPV, TPE-v), thermoplastic polyurethanes (TPU), thermoplastic copolyester (TPC, TPE-E), and thermoplastic polyamides (TPA, TPE-A).

The base plate and/or the sensor patch may comprise a first intermediate element. The first intermediate element may be arranged between the electrodes/electrode layer and the first adhesive layer and/or between the second layer and the first adhesive layer. The first intermediate layer may be made of an insulating material.

The base plate and/or the sensor patch may comprise a release liner. The release liner is a protective layer that protects adhesive layer(s) during transport and storage and is peeled off by the user prior to applying the base plate and/or the sensor patch on the skin. The release liner may have a stomal opening, such as a release liner stomal opening, with a centre point.

The base plate and/or the sensor patch may comprise a top layer. The top layer is a protective layer protecting the adhesive layer(s) from external strains and stress when the user wears the ostomy appliance. The electrodes, e.g. some or all the electrodes, may be arranged between the first adhesive layer and the top layer. The top layer may have a stomal opening, such as a top layer stomal opening, with a centre point. The top layer may have a thickness in the range from 0.01 mm to 1.0 mm, e.g. in the range from 0.02 mm to 0.2 mm, such as 0.04 mm.

The base plate and/or the sensor patch comprises a monitor interface. The monitor interface may be configured for electrically and/or mechanically connecting the ostomy appliance (base plate/sensor patch) to the monitor device. The monitor interface may be configured for wirelessly connecting the ostomy appliance (base plate/sensor patch) to the monitor device. Thus, the monitor interface of the base plate and/or the sensor patch is configured to electrically and/or mechanically couple the ostomy appliance and the monitor device.

The monitor interface of the base plate and/or the sensor patch may comprise, e.g. as part of a first connector of the monitor interface, a plurality of terminals, such as two, three, four, five, six, seven or more terminals, for forming electrical connections with respective terminals of the monitor device. The monitor interface may comprise a ground terminal element forming a ground terminal. The monitor interface may comprise a first terminal element forming a first terminal, a second terminal element forming a second terminal and optionally a third terminal element forming a third terminal. The monitor interface may comprise a fourth terminal element forming a fourth terminal and/or a fifth terminal element forming a fifth terminal. The monitor interface optionally comprises a sixth terminal element forming a sixth terminal. The terminal elements of the monitor interface may contact respective electrodes of the base plate and/or the sensor patch, such as the electrode assembly. The first intermediate element may be arranged between the terminal elements and the first adhesive layer. The first intermediate element may cover or overlap terminal element(s) of the base plate and/or the sensor patch when seen in the axial direction. Thus, the first adhesive layer may be protected or experience more evenly distributed mechanical stress from the terminal elements of the base plate and/or the sensor patch, in turn reducing the risk of terminal elements penetrating or otherwise damaging the first adhesive layer. The first intermediate element may protect or mechanically and/or electrically shield the first adhesive layer from the terminal elements of the base plate and/or the sensor patch.

A terminal element, such as the ground terminal element, the first terminal element, the second terminal element, the third terminal element, the fourth terminal element, the fifth terminal element and/or the sixth terminal element, may comprise a distal end and a proximal end. A terminal element, such as the ground terminal element, the first terminal element, the second terminal element, the third terminal element, the fourth terminal element, the fifth terminal element and/or the sixth terminal element, may comprise a distal part, a centre part, and/or a proximal part. The distal part may be between the distal end and the centre part. The proximal part may be between the proximal end and the centre part. A terminal element, such as the ground terminal element, the first terminal element, the second terminal element, the third terminal element, the fourth terminal element, the fifth terminal element and/or the sixth terminal element, may be gold plated copper.

The base plate and/or the sensor patch may have a stomal opening, e.g. with a centre point. The stomal opening of the base plate and/or the sensor patch may be formed collectively of stomal opening(s) of the layers of the base plate and/or the sensor patch, such as of the top layer, the first adhesive layer, the second layer and/or the sensor patch. The stomal opening(s) of the layers of the base plate and/or the sensor patch, such as of the top layer, the first adhesive layer, the second layer and/or the sensor patch may be aligned to form the stomal opening of the base plate and/or the sensor patch. The stomal opening may be a through-going passage of the base plate and/or the sensor patch. The stomal opening may be arranged substantially in the centre of the base plate and/or the sensor patch. The stomal opening(s) of the layers of the base plate and/or the sensor patch may be arranged substantially in the centre of the respective layer. The stomal opening may be configured to receive a stoma of the user and/or the stomal opening may be configured to allow output from the stoma to pass through the stomal opening an into an ostomy pouch attached to the base plate. For example, the stomal opening may be configured to allow passage of output from a proximal side of the base plate and/or sensor patch to a distal side of the base plate and/or sensor patch. The size and/or shape of the stomal opening is typically adjusted by the user or nurse before application of the ostomy appliance to accommodate the user's stoma. In one or more exemplary base plates and/or sensor patches, the user forms the stomal opening during preparation of the base plate and/or the sensor patch for application.

The monitor device comprises a processor and one or more interfaces, such as a first interface and/or a second interface. The monitor device may comprise a memory for storing ostomy data.

In one or more exemplary monitor devices, the processor is configured to apply a processing scheme, the first interface is connected to the processor and the memory, and the first interface is configured for collecting ostomy data from the base plate and/or the sensor patch coupled to the first interface. The ostomy data may comprise one or more, such as all, of first ostomy data from a first electrode pair of the base plate and/or the sensor patch, second ostomy data from a second electrode pair of the base plate and/or the sensor patch, and third ostomy data from a third electrode pair of the base plate and/or the sensor patch. A second interface is connected to the processor. To apply a processing scheme may comprise one or more of obtain first parameter data based on the first ostomy data; obtain second parameter data based on the second ostomy data; and obtain third parameter data based on the third ostomy data. To apply a processing scheme may comprise determine an operating state of the base plate of the ostomy appliance based on one or more, such as all, of the first parameter data, the second parameter data and the third parameter data. The operating state may be indicative of a degree of radial erosion of the base plate and/or the sensor patch, such as of the first adhesive layer, and/or an acute leakage risk for the ostomy appliance. The monitor device is configured to, in accordance with a determination that the operating state is a first operating state, transmit a first monitor signal comprising monitor data indicative of the first operating state of the base plate via the second interface; and/or in accordance with a determination that the operating state is a second operating state, transmit a second monitor signal comprising monitor data indicative of the second operating state of the base plate via the second interface.

In one or more exemplary monitor devices, the first operating state of the base plate corresponds to a situation wherein the first adhesive layer of the base plate and/or the sensor patch has experienced a first degree of radial erosion, e.g. the first adhesive layer is eroded to a first radial distance of the first electrode pair but not to a second radial distance of the second electrode pair.

In one or more exemplary monitor devices, the second operating state of the base plate corresponds to a situation wherein the first adhesive layer of the base plate and/or the sensor patch has experienced a second degree of radial erosion, e.g. the first adhesive layer is eroded to the second radial distance of the second electrode pair but not to a third radial distance of the third electrode pair.

The monitor device comprises a monitor device housing optionally made of a plastic material. The monitor device housing may be an elongate housing having a first end and a second end. The monitor device housing may have a length or maximum extension along a longitudinal axis in the range from 1 cm to 15 cm. The monitor device housing may have a width or maximum extension perpendicular to the longitudinal axis in the range from 0.5 cm to 3 cm. The monitor device housing may be curve-shaped.

The monitor device comprises an electronic circuitry. The electronic circuitry may comprise a processor 101 and one or more interfaces, including a first interface 102 (appliance interface) and a second interface 104 (accessory interface), a memory 106 for storing ostomy data and/or parameter data based on the ostomy data, a sensor unit and a power unit. The monitor device comprises a first interface. The first interface may be configured as an appliance interface for electrically and/or mechanically connecting the monitor device to the ostomy appliance. The first interface may comprise one or more terminals and a coupling part.

Thus, the appliance interface is configured to electrically and/or mechanically couple the monitor device and the ostomy appliance. The first interface may be configured as an accessory device interface for electrically and//or mechanically connecting the monitor device to an accessory device, such as a docking station. The first interface may be configured for coupling to a docking station of the ostomy system, e.g. for charging the monitor device and/or for data transfer between the monitor device and the docking station.

The first interface may comprise one or more terminals and a coupling part for connecting with the proximal end for a tail portion of the monitor device.

The first interface of the monitor device may comprise a plurality of terminals, such as two, three, four, five, six, seven or more terminals, for forming electrical connections with respective terminals and/or electrodes of the ostomy appliance. One or more terminals of the first interface may be configured for forming electrical connections with an accessory device, e.g. with respective terminals of a docking station. The first interface may comprise a ground terminal. The first interface may comprise a first terminal, a second terminal and optionally a third terminal. The first interface may comprise a fourth terminal and/or a fifth terminal. The first interface optionally comprises a sixth terminal. In one or more exemplary monitor devices, the first interface has M terminals, wherein M is an integer in the range from 4 to 8.

The first interface of the monitor device may comprise a coupling part (may alternatively be denoted a device coupling part or a monitor device coupling part) for forming a mechanical connection, such as a releasable coupling between the monitor device and the base plate and/or the sensor patch. The coupling part and the terminals of the first interface form (at least part of) a first connector of the monitor device (may alternatively be denoted third coupling element).

The monitor device comprises a power unit for powering the monitor device. The power unit may comprise a battery.

The power unit may comprise charging circuitry connected to the battery and terminals of the first interface for charging the battery via the first interface, e.g. the first connector. The first interface may comprise separate charging terminal(s) for charging the battery.

The monitor device comprises an electronic circuitry connected to the one or more terminals of the first interface.

The monitor device may comprise a sensor unit with one or more sensor. The sensor unit is connected to the processor for feeding sensor data to the processor. The sensor unit may comprise an accelerometer for sensing acceleration and provision of acceleration data to the processor. The sensor unit may comprise a temperature sensor for provision of temperature data to the processor.

The monitor device comprises a second interface connected to the processor. The second interface may be configured as an accessory interface for connecting, e.g. wirelessly connecting, the monitor device to one or more accessory devices. The second interface may comprise an antenna and a wireless transceiver, e.g. configured for wireless communication at frequencies in the range from 2.4 to 2.5 GHz. The wireless transceiver may be a Bluetooth transceiver, i.e. the wireless transceiver may be configured for wireless communication according to Bluetooth protocol, e.g. Bluetooth Low Energy, Bluetooth 4.0, Bluetooth 5. The second interface optionally comprises a loudspeaker and/or a haptic feedback element for provision of an audio signal and/or haptic feedback to the user, respectively.

The ostomy system may comprise a docking station forming an accessory device of the ostomy system. The docking station may be configured to electrically and/or mechanically couple the monitor device to the docking station.

The docking station may comprise a docking monitor interface. The docking monitor interface may be configured for electrically and/or mechanically connecting the monitor device to the docking station. The docking monitor interface may be configured for wirelessly connecting the monitor device to the docking station. The docking monitor interface of the docking station may be configured to electrically and/or mechanically couple the docking station and the monitor device.

The docking monitor interface of the docking station may comprise, e.g. as part of a first connector of the docking monitor interface, a coupling part for forming a mechanical connection, such as a releasable coupling between the monitor device and the docking station. The coupling part may be configured to engage with a coupling part of the monitor device for releasably coupling the monitor device to the docking station.

The docking monitor interface of the docking station may comprise, e.g. as part of a first connector of the docking monitor interface, a plurality of terminals, such as two, three, four, five, six, seven or more terminals, for forming electrical connections with respective terminals of the monitor device. The docking monitor interface may comprise a ground terminal. The docking monitor interface may comprise a first terminal and/or a second terminal. The docking station may comprise a third terminal. The docking monitor interface may comprise a fourth terminal and/or a fifth terminal. The docking monitor interface optionally comprises a sixth terminal.

The monitor interface may comprise a plurality of terminals electrically connected to the plurality of electrodes and configured to connect with respective terminals of the monitor device.

Disclosed is a monitor device for connecting to a sensor patch of an ostomy appliance, the monitor device comprising; a housing, an electronic circuitry; a first interface configured for collecting sensor data from the sensor patch; and a tail portion comprising a proximal end and a distal end, where the tail portion comprises one or more electrodes extending from the proximal end of the tail portion to the distal end, the one or more electrodes being connected to the first interface at the proximal end of the tail portion, and the distal end of the tail portion comprising a first coupling element, and where the one or more electrodes are connected to the first coupling element at the distal end of the tail portion, the monitor device being adapted to couple mechanically and electrically the first interface of the monitor device to the sensor patch of an ostomy appliance for relaying signals from the sensor patch to the monitor device.

Also disclosed is an ostomy system comprising a base plate and/or a sensor patch and a monitor device, such as the base plate and/or the sensor patch as disclosed above, and the monitor device as disclosed above. The ostomy system may further comprise an ostomy pouch.

The ostomy system may comprise a sensor patch for a ostomy appliance and a monitor device as disclosed above, and where the sensor patch and/or ostomy appliance comprises a fourth coupling element, and wherein the first coupling element at the distal end of the tail portion and the fourth coupling element at the ostomy appliance constitute a first set of complementary shaped coupling elements adapted for electrically and mechanically detachably connecting the tail portion to the sensor patch of the ostomy appliance.

Providing the first coupling element of the monitor device at an end of an elongated tail portion may provide the advantage that the monitor device, after being coupled to the base plate and/or the sensor patch, may be repositioned by the user, e.g. may be positioned in an advantageous position, such as in a preferred personalized position. Thus, the monitor device may be more freely positioned after being coupled to the base plate and/or the sensor patch. Furthermore, the elongated tail portion may facilitate for easier coupling the monitor device and the base plate and/or the sensor patch since the first coupling element may be turned, twisted and/or repositioned upon coupling of the monitor device to the base plate and/or the sensor patch. Providing for an easier coupling of the monitor device to the base plate and/or the sensor patch, may be of particular importance for an ostomy user, since the ostomy appliance may be situated on the body in a position complicating coupling of the monitor device. For example, the ostomy appliance may be partly hidden, such that the user needs to use a mirror in order to see what he/she is doing in coupling the monitor device to the base plate and/or the sensor patch. Also, the ostomy appliance may be positioned to restrict the possibility for the user to use both hands. It is therefore a further advantage of the present disclosure, that it may facilitate the coupling of the monitor device to the base plate and/or the sensor patch using both hands.

In an embodiment, the tail portion of the monitor device may be provided with an elongated tail body having a length in a longitudinal direction from the proximal end to the distal end in the range of 10-50 cm, such as 15-40 cm or 20-30 cm. Hereby, the possible variation for personal preference of positioning the monitor device has been increased.

In an embodiment, the tail portion may comprise an adhesive layer extending partly or fully in a longitudinal direction of the elongated tail body, the adhesive layer being adapted to adhere to the skin of a user. Hereby, the variation for fastening of the monitor device is increased.

In an embodiment, the first coupling element at the distal end of the tail portion consists of a conductive adhesive layer. Hereby is achieved a simple and easy way to couple the tail portion of the monitor device to the ostomy appliance.

In an embodiment, the elongated tail body may comprise a flexible and/or elastic body shape. Hereby the monitor device and the tail portion will be able to follow the movement of the user's body and thereby the monitor device may be more comfortable for the user to wear.

In an embodiment, the elongated tail body and the one or more electrodes may be in the form of a coated wire/cable. Hereby, a simple construction is achieved, and it will be easy to position the monitor device in a preferred position for the user, when in use.

In an embodiment, the elongated tail body may comprise a helix shape in a longitudinal direction. Hereby, the ability to bend and/or twist the elongated tail body may be increased.

In an embodiment, the monitor device and the proximal end of the tail portion may comprise a second and a third complementary shaped coupling element adapted for electrically and mechanically detachably connecting the tail portion to the monitor device.

In an embodiment, the monitor device may comprise at least three coupling elements.

In an embodiment, the coupling elements may be complementary shaped male- and female coupling elements.

In an embodiment, the at least one male-shaped coupling element may be a jack plug.

In an embodiment, the first interface of the monitor device may comprise a plurality of terminals adapted for structurally connecting with a plurality of terminals of electrodes at the third coupling element of the tail portion.

In an embodiment, the monitor device may comprise an attachment element being configured to attach to an ostomy pouch of the ostomy appliance and/or to a rim of clothing, bag or similar.

In an embodiment, the monitor device may comprise a second interface configured for connecting the monitor device to one or more accessory devices.

In an embodiment, the second interface may comprise an antenna and a wireless transceiver, e.g. configured for wireless communication at frequencies in the range from 2.4 to 2.5 GHz.

In an embodiment, the second interface may comprise a loudspeaker and/or a haptic feedback element adapted for provision of an audio signal and/or haptic feedback to the user, respectively.

Also disclosed is an ostomy system as disclosed above. The ostomy system may comprise a fourth coupling element, wherein the first coupling element at the distal end of the tail portion and the fourth coupling element at the ostomy appliance constitute a first set of complementary shaped coupling elements adapted for electrically and mechanically detachably connecting the tail portion of the monitor device to the sensor patch of the ostomy appliance.

The ostomy system may at the proximal end of the tail portion may comprise a second coupling element and the monitor device comprises a third coupling element, where the second and third coupling elements constitute a second set of complementary shaped coupling elements adapted for electrically and mechanically detachably connecting the tail portion to the monitor device.

In an embodiment, the first, second, third and fourth coupling elements may be complementary shaped male and female coupling elements.

In an embodiment, the one or more electrodes of the tail portion correspond to the number of electrodes of the sensor patch.

In an embodiment, the monitor device coupling part may be provided at the rim surface, such as at a first part of the rim surface. For example, the monitor device coupling part may be provided by an opening in the rim surface, such as in the first part of the rim surface.

The base plate and/or the sensor patch, such as the monitor interface, such as the coupling part, may comprise a locking mechanism. Alternatively or additionally, the monitor device may comprise a locking mechanism. The locking mechanism(s) may be configured to lock the monitor device in a coupled position with the base plate and/or the sensor patch. For example, the locking mechanism(s) may provide that the monitor device is maintained in the coupled position with the base plate and/or the sensor patch. The locking mechanism(s) may be configured to automatically lock the monitor device in the coupled position with the base plate and/or the sensor patch. For example, the locking mechanism(s) may be biased, e.g. spring biased, towards locking of the locking mechanism(s). For example, the locking mechanism may comprise biasing means, e.g. a spring, that biases the locking mechanism towards a locked position. The locking mechanism(s) may be configured to unlock the monitor device from the coupled position with the base plate and/or the sensor patch upon user interaction. Alternatively or additionally, the locking mechanism(s) may be configured to lock the monitor device in the coupled position with the base plate and/or the sensor patch upon user interaction.

The coupling part(s), such as the monitor device coupling part and/or the coupling part of the base plate and/or the sensor patch, may form a USB type plug or port. For example, the coupling part(s) may conform with a USB standard.

An ostomy pouch may be attached to the base plate, such as for a two-part ostomy appliance. Alternatively, the base plate and the ostomy pouch may be provided together, such as a one-part ostomy appliance.

The monitor device and/or the base plate and/or the sensor patch may comprise an attachment element. For example, the attachment element may be positioned at the first flexible element end of the base plate and/or the sensor patch. The attachment element may be configured to attach to the ostomy pouch, such as a part of the ostomy pouch, of the ostomy appliance. By attaching the ostomy pouch to the monitor device and/or to the base plate and/or the sensor patch, such as to the base plate and/or the sensor patch near the monitor device, the monitor device may be shielded from the skin of the user. Also, the monitor device may be hidden by the ostomy pouch. Also, the monitor device may be more securely retained, such as to avoid decoupling of the monitor device from the base plate and/or the sensor patch during use. Furthermore, the user may be made aware of the monitor device upon changing the ostomy pouch and/or the base plate and/or the sensor patch, and the risk of discarding the monitor device with the ostomy pouch and/or the base plate and/or the sensor patch may be reduced.

The attachment element may be in the form of a clamp, such as a clamp configured to clamp to an edge of the ostomy pouch. Alternatively or additionally, the attachment element is in the form of a slit configured to receive an edge of the ostomy pouch. Alternatively or additionally, the attachment element may be in the form of a Velcro element, such as a Velcro element configured to attach to an opposing Velcro element of the ostomy pouch. Alternatively or additionally, the attachment element is in the form of a magnetic material, such as a magnetic material configured to attach to an opposing magnetic material of the ostomy pouch.

FIG. 1 illustrates an exemplary ostomy system. The ostomy system 1 comprises an ostomy appliance 2 including a base plate 4. The base plate 4 is adapted to support an ostomy pouch (not shown). Further, the ostomy system 1 comprises a monitor device 6 and an accessory device 8 (mobile telephone). The monitor device 6 comprises a tail portion 30, which comprises a proximal end 31 and a distal end 32. The tail portion 30 comprises an elongated tail body 38 providing a distance between the proximal and distal end of the tail portion 30. The distal end 32 of the tail portion comprises a first coupling element 33, and the ostomy appliance 2 comprises a fourth coupling element 34, the first coupling element and the fourth coupling element are adapted mechanical and electrically to couple the monitor device to the sensor patch.

In the figure the fourth coupling element 34 is positioned at the periphery of the base plate 4 and the tail portion 30 is connectable to the base plate 4 via respectively the first and fourth coupling elements 33,34 of the monitor device 6 and base plate 4.

The monitor device 6 is configured for wireless communication with the accessory device 8. Optionally, the accessory device 8 is configured to communicate with a server device 11 of the ostomy system 1, e.g. via network 12. The server device 11 may be operated and/or controlled by the ostomy appliance manufacturer and/or a service centre. Ostomy data or parameter data based on the ostomy data are obtained from electrodes/sensors of the ostomy appliance 2 with the monitor device 6. The monitor device 6 processes the ostomy data and/or parameter data based on the ostomy data to determine monitor data that are transmitted to the accessory device 8. In the illustrated ostomy system, the accessory device 8 is a mobile phone, however the accessory device 8 may be embodied as another handheld device, such as a tablet device, or a wearable, such as a watch or other wrist-worn electronic device. Accordingly, the monitor device 6 is configured to determine and transmit monitor data to the accessory device 8. The base plate 4 may comprise a coupling member 14 in the form of a coupling ring for coupling an ostomy pouch (not shown) to the base plate (two-part ostomy appliance). The base plate has a stoma-receiving opening 18 with a stoma centre point. The size and/or shape of the stomal opening 18 is typically adjusted by the user or nurse before application of the ostomy appliance to accommodate the user's stoma.

Figure 2:
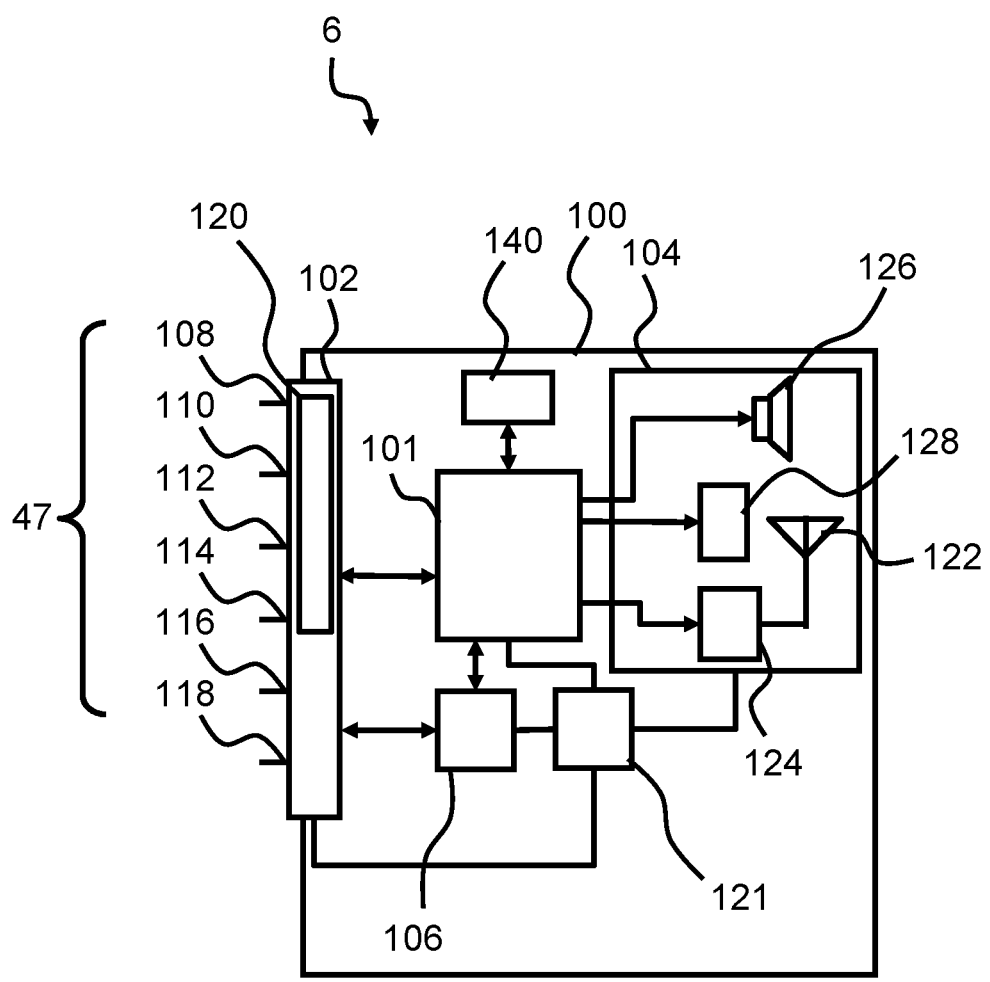
FIG. 2 illustrates an exemplary monitor device of the ostomy system.

The ostomy system 1 optionally comprises a docking station 20 forming an accessory device of the ostomy system 1. The docking station 20 comprises a docking monitor interface including a first connector 22 configured for electrically and/or mechanically connecting the monitor device 6 to the docking station 20. The docking monitor interface may be configured for wirelessly connecting the monitor device to the docking station. The docking station 20 comprises a user interface 24 for receiving user input and/or providing feedback to the user on the operational state of the docking station 20. The user interface 24 may comprise a touch-screen. The user interface 24 may comprise one or more physical buttons and/or one or more visual indicators, such as light emitting diodes, FIG. 2 is a schematic block diagram of an exemplary monitor device comprising an electronic circuitry. The monitor device 6 comprises a monitor device housing 100, a processor 101 and one or more interfaces, the one or more interfaces including a first interface 102 (appliance interface) and a second interface 104 (accessory interface). The monitor device 6 comprises a memory 106 for storing ostomy data and/or parameter data based on the ostomy data. The memory 106 is connected to the processor 101 and/or the first interface 102.

The first interface 102 is configured as an appliance interface for electrically and/or mechanically connecting the monitor device 6 to the ostomy appliance. The first interface 102 comprises a plurality of terminals 47 (108, 110, 112, 114, 116, 118) for forming electrical connections with respective terminals of the ostomy appliance 2 (denoted terminals 212 of sensor patch 10 illustrated at FIG. 3). The first interface 102 comprises a ground terminal 108, a first terminal 110, a second terminal 112 and a third terminal 114. The first interface 102 optionally comprises a fourth terminal 116 and a fifth terminal 118. The first interface 102 of the monitor device 6 comprises a coupling part 120 (the coupling part being part of the third coupling element 35 as illustrated in FIG. 4A,4B,4C) for forming a mechanical connection, such as a releasable coupling between the monitor device and the tail portion 30. The coupling part 120 and the terminals 108, 110, 112, 114, 116, and 118 of the first interface 102 form (at least part of) a third coupling element of the monitor device 6.

The monitor device 6 comprises a power unit 121 for powering the monitor device and active components thereof, i.e. the power unit 121 is connected to the processor 101, the first interface 102, the second interface 104, and memory 106. The power unit comprises a battery and charging circuitry. The charging circuitry is connected to the battery and terminals of the first interface 102 for charging the battery via terminals of the first interface.

The second interface 104 of monitor device is configured as an accessory interface for connecting the monitor device 6 to one or more accessory devices such as accessory device 8. The second interface 104 comprises an antenna 122 and a wireless transceiver 124 configured for wireless communication with accessory device(s). Optionally, the second interface 104 comprises a loudspeaker 126 and/or a haptic feedback element 128 for provision of respective audio signal and/or haptic feedback to the user.

The monitor device 6 comprises a sensor unit 140 connected to the processor 101. The sensor unit 140 comprises a temperature sensor for feeding temperature data to the processor and a G-sensor or accelerometer for feeding acceleration data to the processor 101.

The processor 101 is configured to apply a processing scheme, and the first interface 102 is configured for collecting ostomy data from the sensor patch 10. The ostomy data comprising first ostomy data from a first electrode pair of the base plate, second ostomy data from a second electrode pair of the base plate, and third ostomy data from a third electrode pair of the base plate. The ostomy data may be stored in the memory 106 and/or processed in the processor 101 in order to obtain parameter data. The parameter data may be stored in the memory 106. The processor 101 is configured to apply a processing scheme, wherein to apply a processing scheme comprises obtain first parameter data based on the first ostomy data; obtain second parameter data based on the second ostomy data; obtain third parameter data based on the third ostomy data. In other words, the processor 101 is configured to obtain first, second and third parameter data based on respective first, second and third ostomy data. To apply a processing scheme comprises to determine an operating state of the base plate of the ostomy appliance based on one or more, e.g. all, of the first parameter data, the second parameter data and the third parameter data, wherein the operating state is indicative of a degree of radial erosion of the base plate and/or acute leakage risk for the ostomy appliance. The monitor device 6 is configured to, in accordance with a determination that the operating state is a first operating state, transmit a first monitor signal comprising monitor data indicative of the first operating state of the base plate via the second interface; and in accordance with a determination that the operating state is a second operating state, transmit a second monitor signal comprising monitor data indicative of the second operating state of the base plate via the second interface.

Figure 3:
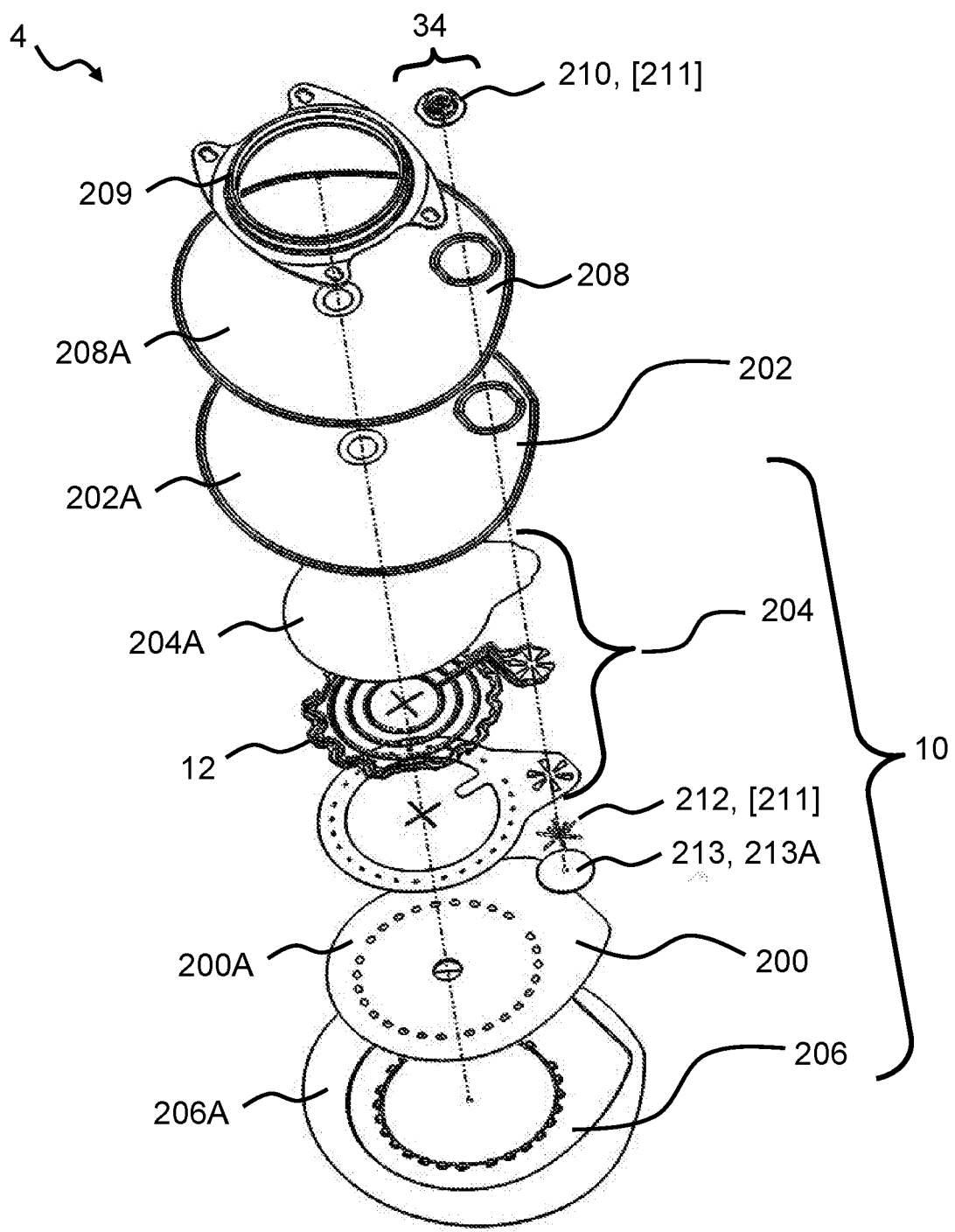
FIG. 3 is an exploded view of a base plate of an ostomy appliance.

FIG. 3 illustrates an exploded view of an exemplary base plate of an ostomy appliance. The base plate 4 comprises a first adhesive layer 200. During use, a proximal surface of the first adhesive layer 200 adheres to the user's skin in the peristomal area and/or to additional seals, such as sealing paste, sealing tape and/or sealing ring. The base plate 4 optionally comprises a second adhesive layer 202, also denoted rim adhesive layer. The base plate 4 comprises a plurality of electrodes 12 arranged in an electrode assembly 204, also called sensor patch 10. The electrode assembly 204 is arranged between the first adhesive layer 200 and the second adhesive layer 202. The electrode assembly 204 comprises a support layer with electrodes formed on a proximal surface of the support layer.

The base plate 4 comprises a release liner 206 that is peeled off by the user prior to applying the base plate 4 on the skin. The base plate 4 comprises a top layer 208 and a coupling ring 209 for coupling an ostomy pouch to the base plate 4. The top layer 208 is a protective layer protecting the second adhesive layer 202 from external strains and stress during use.

The base plate 4 comprises a fourth coupling element 34 configured for electrically and/or mechanically connecting the ostomy appliance (and/or sensor patch 10) to the monitor device 6. The fourth coupling element 34 of the base plate 4 comprises a coupling part 210 for forming a mechanical connection to the sensor patch 10 of the base plate 4.

Furthermore, the fourth coupling element 34 forming a releasable coupling between the first coupling element of the tail portion 30 of the monitor device 6. Further, the monitor interface of the base plate 4 comprises a plurality of terminal elements respectively forming a plurality of terminals 212 for forming electrical connections with respective terminals (47, as illustrated in FIG. 2) of the monitor device. The coupling part 210 and the terminals 212 form a first connector 211 of the base plate 4. The base plate 4 comprises a first intermediate element 213 on the proximal side of the electrode assembly. The first intermediate element 213 is arranged between the terminal elements forming terminals 212 and the first adhesive layer (not shown). The first intermediate element 213 covers the terminal elements forming terminals 212 of the base plate 4 when seen in the axial direction and protects the first adhesive layer from mechanical stress from the terminal elements of the base plate.

The coupling part 210 and the terminals 212 form a first connector 211 of the base plate 4. The fourth coupling element 34 comprises the coupling part 210, the terminals 212 and the first connector 211 of the base plate 4, as illustrated in FIG. 3.

As previously described, some parts of the illustrated base plate 4, may be provided as a separate assembly to be applied to an existing base plate, e.g. comprising one or more of the components as described, such as to provide a base plate like the base plate 4 as described. For example, a sensor patch 10 may be provided, e.g. comprising the electrode assembly 204, the first connector 211, the first intermediate element 213, the first adhesive layer 200 and the release liner 206. Additionally, the sensor patch 10 may also comprise the second adhesive layer 202 and/or the top layer 208. It may be envisioned that the user may provide a hole in layers of the base plate whereto the sensor patch 10 is to be applied, to allow for the first connector 211 of the sensor patch 10 to protrude through layers of the base plate whereto the sensor patch 10 is applied. Alternatively, the sensor patch 10 may be applied to the base plate such that the first connector 211 is positioned outside the periphery of the base plate.

Figure 4:
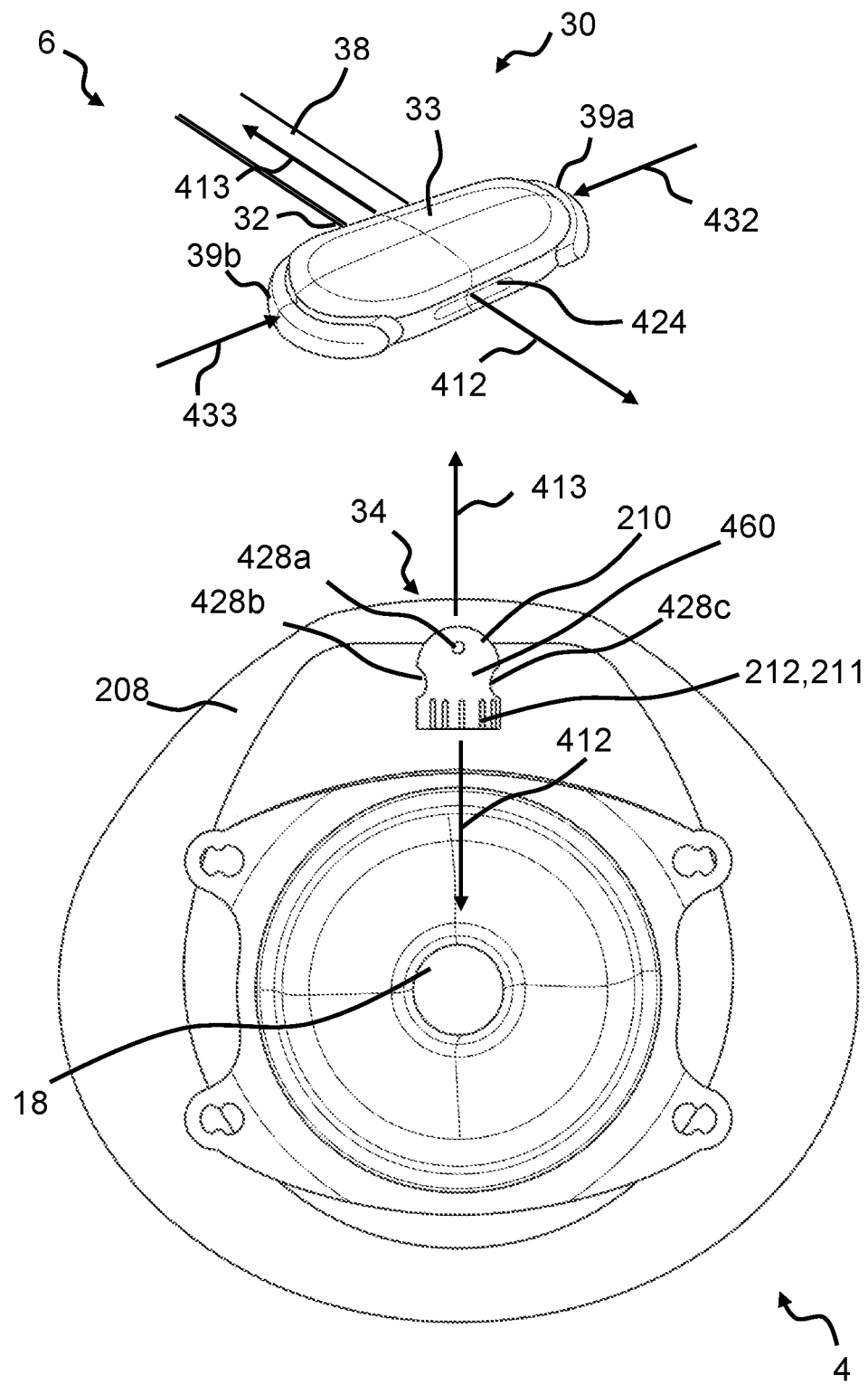
FIG. 4 illustrates an exemplary monitor device and ostomy appliance.

FIG. 4 illustrates an exemplary base plate 4, such as the base plate as illustrated in FIG. 3, and the distal end of the tail portion 30 of the monitor device 6. The tail portion comprises an exemplary first coupling element 33.

The base plate 4 comprises a fourth coupling element 34. The first and fourth coupling elements 33,34 are configured for coupling between the monitor device 6 and the base plate 4.

The coupling element 34 comprises a coupling part 210, which is configured to engage with an opening of the first coupling element 33 of the monitor device 6 by a motion, such as a linear motion, in an engagement direction 412 of the monitor device 6 relative to the base plate 4. The first coupling element 33 comprises an opening 424 for example in a rim surface of the first coupling element 33. The opening 424 may form part of a female coupling element 33. The female coupling element 33 at the distal end 32 of the tail portion 30 is configured to receive the male coupling element 34 of the base plate 4. The two coupling elements 33,34 is configured to engage by a motion in the engagement direction 412 of the monitor device 6 relative to the base plate 4. The engagement direction 412 may be towards a stomal opening 18 of the base plate 4.

The plurality of terminals 212 of the base plate is provided on the coupling part 210. The plurality of terminals of the coupling element 33 may be provided inside the opening 424 such as to connect to the plurality of terminals 212 of the base plate 4, when the coupling element 33 of the monitor device 6 is coupled to the base plate 4.

The coupling element 33 of the monitor device 6 is configured to disengage with the coupling part 210 of the base plate 4 by the motion in the disengagement direction 413 of the coupling element 33 of the monitor device 6 relative to the base plate 4. The disengagement direction 413 may be away from the stomal opening 18 of the base plate 4.

The top layer 208 and the first adhesive layer are substantially planar and extending in a base plate plane, for example prior to being applied to a user's skin. The engagement direction 412 and/or the disengagement direction 413 may be substantially parallel to the base plate plane. Alternatively or additionally, the engagement direction 412 and/or the disengagement direction 413 may form an engagement angle with the base plate plane, and the engagement angle may be less than 45 degrees, such as between 0 and 45 degrees.

The monitor device 6 and/or the base plate 4 comprises a locking mechanism configured to lock the monitor device 6 in a coupled position with the base plate 4. The locking mechanism comprises a locking element 39 comprising a first button 39*a* and a second button 39*b*.

The first button 39a is deflectable in a first direction 432 and the second button 39b is deflectable in a second direction 433. The first direction 432 is substantially opposite the second direction 433. The first direction 432 and the second direction 433 are substantially perpendicular to the engagement direction 412 and/or the disengagement direction 413, such as to allow the user to pinch the first button 39a and second button 39b while engaging and/or disengaging the monitor device 6 to the base plate 4.

The locking element 39 is configured to unlock and/or lock the locking mechanism, such as to unlock the first coupling element 33 while in the coupled position with the base plate 4 and/or to lock the first coupling element 33 while in the coupled position with the base plate 4. For example, the first button 39a and the second button 39b is to be pressed simultaneously to lock and/or unlock the first coupling element 33 in the coupled position with the base plate 4. For example, the first button 39a and the second button 39b may be pressed in order to lock the first coupling element 33 in the coupled position with the base plate 4, and subsequently the first button 39a and the second button 39b may be pressed again to unlock the first coupling element 33 in the coupled position with the base plate 4. Alternatively, the locking mechanism may be biased, such as spring biased, towards locking of the first coupling element 33 in the coupled position with the base plate 4, and the first button 39a and the second button 39b may be pressed to unlock the first coupling element in the coupled position with the base plate 4.

The locking mechanism of the first coupling element 33 is configured to cooperate with a locking section 428 of the base plate 4. The locking section 428 in the illustrated example comprises a hole 428a extending through the coupling part 210, a first indent 428b in a first edge of the coupling part 210 and a second indent 428c in a second edge of the coupling part 210. Thus, for example, the locking mechanism of the first coupling part 33 may comprise a pin to engage with the hole 428a of the coupling part 210 of the base plate 4, and/or the locking mechanism of the first coupling element may comprise elements being deflectable perpendicular to the engagement direction 412, such as to engage with the first indent 428b and/or the second indent 428c.

Figure 5:
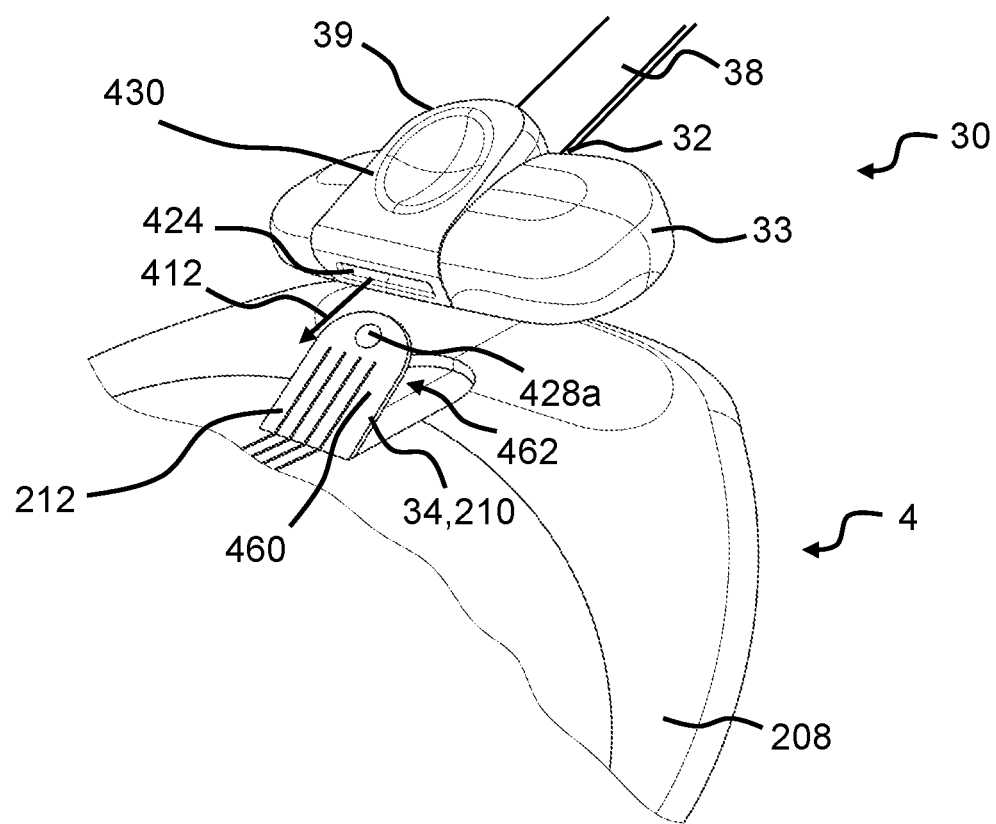
FIG. 5 illustrates exemplary coupling elements of the ostomy system.

The coupling part 210 is substantially flat and comprises a first surface 460 and a second surface 462 (see FIG. 5). The second surface 462 is facing the top layer 208 and the first surface 460 is facing away from the top layer 208. The second surface 462 may be facing substantially in a proximal direction and the first surface 460 may be facing substantially in a distal direction. The plurality of terminals 212 may be provided on the first surface 460 and/or on the second surface 462 of the coupling part 210.

The second surface 462 of the coupling part 210 and the top layer 208 may be separated, such as to allow at least a part of the first coupling element 33 to be positioned between the second surface of the coupling part 210 and the top layer 208, for example to allow the coupling part 210 to be received by the opening 424 of the first coupling element 33.

FIG. 5 schematically illustrates part of an exemplary base plate 4, such as the base plate as illustrated in FIG. 3.

The first coupling element 33 as shown in FIG. 5 comprises an opening 424, for example in a rim surface of the first coupling element 33. The opening 424 is configured to receive the coupling part 210 of the base plate 4. The first coupling element 33 is configured to engage with the coupling part 210 of the base plate 4 by a motion, such as a linear motion, in the engagement direction 412 of the first coupling element 33 of the monitor device 6 relative to the base plate 4. The first coupling element 33 is configured to disengage with the coupling part 210 of the base plate 4 by a motion, such as a linear motion, in the disengagement direction 413 of the first coupling element 33 relative to the base plate 4.

The plurality of terminals 212 of the base plate is provided on the coupling part 210. The plurality of terminals of the first coupling element 33 may be provided inside the opening 424, such as to connect to the plurality of terminals 212 of the base plate 4 when the first coupling element 33 is coupled to the base plate 4.

The first coupling element comprises a locking mechanism configured to lock the monitor device 6 in a coupled position with the base plate 4. The locking mechanism of the first coupling element 33 is configured to cooperate with the locking section 428 of the base plate 4. The locking section 428 in the illustrated example comprises a hole 428a extending through the coupling part 210. For example, the locking mechanism of the first coupling element 33 may comprise a locking component, for example a pin, positioned inside the opening 424 and being configured to protrude through the hole 428a. As opposed to the example shown in FIG. 4, the locking section 428 of FIG. 5 does not comprise the indentations 428b, 428c. However, it is noted that the locking section 428 of FIG. 4 may optionally comprise the indentations 428b, 428c, as shown in FIG. 4.

The locking mechanism comprises a locking element 430 comprising a first button 430a. The locking element 430, such as the first button 430a, further comprises a locking element protrusion 431. The first button 430a is deflectable in a first direction 432 and the locking element protrusion 431 is configured for the user to pull/push the first button 430a in a second direction 433, opposite the first direction 432. The locking element 430 may be configured for a rotational movement about an axis substantially perpendicular to the engagement direction 412 and/or the disengagement direction 413. The axis of rotation of the locking element 430 may be substantially parallel to a base plate plane of the base plate 4.

The locking element 430 is configured to unlock and/or lock the locking mechanism, such as to unlock the first coupling element 33 in the coupled position with the base plate 4 and/or to lock the first coupling element 33 of the monitor device 6 in the coupled position with the base plate 4. For example, the user may push the first button 430a in the first direction, for example to lock the locking mechanism, and the user may subsequently push/pull the first button 430a by the locking element protrusion 431 in the second direction, for example to unlock the locking mechanism.

Hence, the user may move the first coupling element 33 in the engagement direction 412, such that the coupling part 210 is received in the opening 424, and hereafter, the user may push the first button 430a in the first direction to lock the locking mechanism, and the first coupling element is locked, such as retained, in the coupled position with the base plate 4. Subsequently, in order to remove the first coupling element from the base plate 4, the user may push/pull the locking element protrusion 431 in the second direction 433 to unlock the locking mechanism, and the user may disengage the first coupling element 33 from the base plate 4 by moving the first coupling element in the disengagement direction 413.

The locking element 430 may be configured to be positioned in a plurality of predefined positions, for example including a locked position and a first unlocked position. The predefined positions may be positions of the locking element 430 where a greater force is needed to change the position of the locking element 430. The plurality of predefined positions may include a second unlocked position, such as a cleaning position, where the locking element 430 is opened to allow cleaning of the interior of the opening 424. The locking element may be brought from the locked position to the first unlocked position by movement in the second direction 433, for example by an angular movement of the locking element 430 of between 10-75 degrees. The locking element may be brought from the first unlocked position to the second unlocked position by (further) movement in the second direction 433, for example by an angular movement of the locking element 430 of between 90-170 degrees. The locking element 430 may be brought from the second unlocked position to the first unlocked position by movement in the first direction 432, for example by an angular movement of the locking element 430 of between 90-170 degrees. The locking element 430 may be brought from the first unlocked position to the locked position by (further) movement in the first direction 432, for example by an angular movement of the locking element 430 of between 10-75 degrees. An angular distance between the locked position to the second unlocked position may be between 100-200 degrees.

Figure 6A:
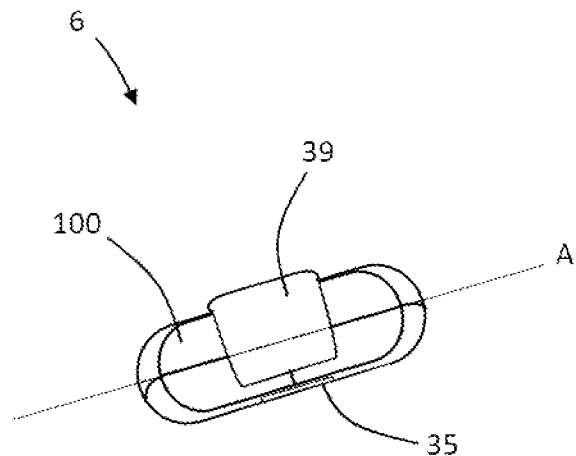
FIG. 6A, 6B, 6C schematically illustrates a monitor device.

FIG. 6A illustrates a perspective view of an exemplary monitor device of an ostomy appliance. The monitor device comprises a monitor device housing 100 optionally made of a plastic material. The monitor device housing may be an elongate housing having a first end and a second end. The monitor device housing may have a length or maximum extension along a longitudinal axis (A) in the range from 1 cm to 15 cm.

The monitor device comprises an opening, also denoted third coupling element 35, positioned in a rim surface of the housing. The monitor device may have a locking mechanism 39 configured to lock the monitor device 6 in a coupled position with the coupling element of the tail portion.

Figure 6B:
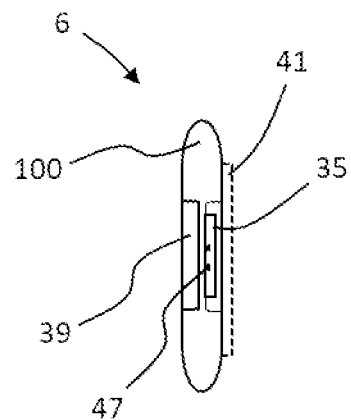

FIG. 6B illustrates the exemplary monitor device, shown in FIG. 6A, in a side view. The monitor device may comprise one or more attachment element 41.

The one or more attachment element may be in the form of a clamp, such as a clamp configured to clamp to an edge of the ostomy pouch or a piece of clothing. The one or more attachment element may be in the form of a Velcro element, such as hook and loop fastener. Additionally and/or alternatively the one or more attachment element may be a layer of adhesive. The adhesive may have the same material properties as the adhesive material for the base plate and/or sensor patch.

The slit-shaped third coupling element 35 comprises a plurality of terminals 47 for forming electrical connections with respective terminals of an ostomy appliance.

Figure 6C:
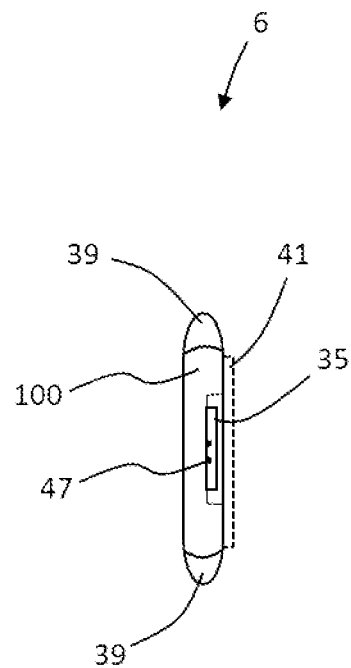

FIG. 6C illustrates an exemplary monitor device have a locking mechanism 39 configured to lock the monitor device 6 in a coupled position with the coupling element of the tail portion. The locking mechanism comprises two locking elements positioned opposed as a first button and a second button, such as to allow a user to pinch the first button and second button while engaging and/or disengaging the monitor device to the proximal end of the tail portion.

Figure 7:
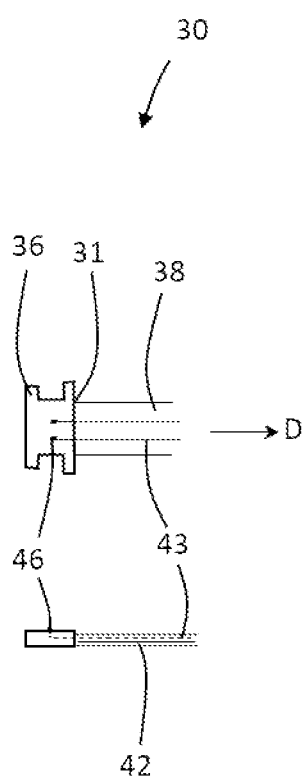
FIG. 7 illustrates an exemplary coupling element at the proximal end of the elongated portion.

FIG. 7 illustrates an exemplary proximal end 31 of a tail portion 30. The tail portion 30 comprises an elongated tail body 38, which may comprise a layer of skin-friendly adhesive layer 42. The elongated tail body 38 is connected to the second coupling element 36 at the proximal end 31 of the tail portion 30. The one or more electrodes 43 extends in longitudinal direction (D) of the elongated tail body 38 and connects to the plurality of terminals 46.

The second coupling element 36 and the third coupling element 35 comprises complementary shaped male and female coupling elements. The coupling elements being adapted for structurally, both mechanically and electrically, connecting the plurality of terminals 46 for the one or more electrodes 43 at the second coupling element 36 with the plurality of terminals 47 at the third coupling element 35.

The elongated tail body 38 is illustrated as a flat wire. However, the elongated tail body 38 may comprise a helix shaped coated wire, whereby the elongated tail body being bendable and/or twistable between the first coupling element 33 and the second coupling element 36 (not illustrated).

An embodiment relates to an ostomy system comprising a sensor patch for an ostomy appliance and a monitor device, the monitor device comprising a housing, an electronic circuitry, and a first interface configured for collecting sensor data from the sensor patch; wherein the monitor device comprises a tail portion comprising a proximal end and a distal end, where the tail portion comprises one or more electrodes extending from the proximal end of the tail portion to the distal end, the one or more electrodes being connected to the first interface at the proximal end of the tail portion, where the distal end of the tail portion comprises a first coupling element, and where the one or more electrodes are connected to the first coupling element at the distal end of the tail portion, the first interface comprising one or more terminals and a coupling part; and wherein the monitor device is adapted to couple mechanically and electrically the first interface of the monitor device to the sensor patch of an ostomy appliance for relaying signals from the sensor patch to the monitor device.

An embodiment relates to an ostomy system comprising a sensor patch, an ostomy appliance and a monitor device, the monitor device comprising a housing, an electronic circuitry, and a first interface configured for collecting sensor data from the sensor patch; wherein the monitor device comprises a tail portion comprising a proximal end and a distal end, where the tail portion comprises one or more electrodes extending from the proximal end of the tail portion to the distal end, the one or more electrodes being connected to the first interface at the proximal end of the tail portion, where the distal end of the tail portion comprises a first coupling element, and where the one or more electrodes are connected to the first coupling element at the distal end of the tail portion, the first interface comprises one or more terminals and a coupling part; and wherein the monitor device is adapted to couple mechanically and electrically the first interface of the monitor device to the sensor patch of an ostomy appliance for relaying signals from the sensor patch to the monitor device.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

The invention claimed is:

1. A monitor device for connecting to a sensor patch of a skin surface appliance, the monitor device comprising:
    a housing comprising
    an electronic circuitry and
    a first interface disposed within the housing and configured for collecting sensor data from the sensor patch; and
    a tail portion comprising a proximal end and a distal end and one or more electrodes extending from the proximal end of the tail portion to the distal end, the one or more electrodes electrically connected to the first interface disposed within the housing;
    wherein the housing includes a first coupling element and a lock, with the first coupling element formed as an opening in a rim surface of the housing and the lock provided as a push button that is biased to move relative to the rim surface of the housing and the sensor patch comprising a flat tab coupling element having a distal second surface facing a top layer of the sensor patch, where the flat tab coupling element is hingedly connected to the top layer to move the distal second surface away from the top layer;
    wherein, when the monitor device is connected to the sensor patch, the flat tab coupling element of the sensor patch is inserted into the opening of the housing and engaged by the lock to allow mechanical and electrical attachment between the first interface of the monitor device and the sensor patch of the skin surface appliance for relaying signals from the sensor patch to the monitor device.

2. The monitor device according to claim 1, wherein the tail portion comprises an elongated tail body having a length in a longitudinal direction from the proximal end to the distal end in a range between 10 cm to 50 cm.

3. The monitor device according to claim 1, wherein the tail portion further comprises an adhesive layer disposed on an exterior surface of the tail portion between the proximal end and the distal end, with the adhesive layer adapted to adhere the tail portion to skin of a user.

4. The monitor device according to claim 2, wherein the elongated tail body is flexible and adapted to follow movements of a user.

5. The monitor device according to claim 2, wherein the elongated tail body and the one or more electrodes comprises a coated wire in a form of a cable.

6. The monitor device according to claim 5, wherein the elongated tail body comprises a helix shape in a longitudinal direction.

7. The monitor device according to claim 1, wherein the monitor device and the proximal end of the tail portion comprise a second and a third complementary shaped coupling element adapted for electrically and mechanically detachably connecting the tail portion to the monitor device.

8. The monitor device according to claim 7, wherein the coupling elements are complementary shaped male and female coupling elements.

9. The monitor device according to claim 8, wherein at least one male-shaped coupling element is a jack plug.

10. The monitor device according to claim 1, wherein the monitor device comprises at least three coupling elements.

11. The monitor device according to claim 1, wherein the first interface of the monitor device comprises a plurality of terminals adapted for structurally connecting with a complementary plurality of terminals of the tail portion.

12. The monitor device according to claim 1, wherein the monitor device comprises an attachment element attachable to a pouch of the skin surface appliance.

13. The monitor device according to claim 1, wherein the monitor device comprises a second interface configured for connecting the monitor device to one or more accessory devices.

14. The monitor device according to claim 13, wherein the second interface comprises an antenna and a wireless transceiver configured for wireless communication at frequencies in the range from 2.4 to 2.5 GHz.

15. The monitor device according to claim 13, wherein the second interface comprises one of a speaker and a haptic feedback element adapted to provide feedback to a user of the monitor device.

16. The monitor device according to claim 1, wherein the push button of the lock, when pushed toward the rim surface of the housing, is configured to release the monitor device from the sensor patch.

17. The monitor device according to claim 1, wherein the push button of the lock is disposed on a lateral edge of the rim surface of the housing, the lock of the monitor device further comprising:
    a second push button disposed on an opposing lateral edge of the rim surface of the housing opposite from the push button, with the opening in the rim surface of the housing disposed between the push button and the second push button.

18. A skin surface system comprising:
    a sensor patch for a skin surface appliance, the sensor patch comprising an adhesive proximal side adapted for attachment to skin and a top layer on a distal side opposite of the adhesive proximal side; and
    a monitor device comprising:
        a housing;
        an electronic circuitry disposed within the housing;
        a first interface and a second interface electrically connected to the electronic circuitry, the first interface is configured for collecting sensor data from the sensor patch;
        a tail portion comprising a proximal end and a distal end and one or more electrodes extending from the proximal end of the tail portion to the distal end, with the distal end of the tail portion connected to the monitor device and the first interface;
        wherein the monitor device comprises a first coupling element formed as a slot and a locking element that rotates between an open position and a closed position, where the closed position of the locking element reduces a height of the slot;
        wherein the sensor patch for the skin surface appliance comprises a fourth coupling element configured as a flat tab having a distal second surface facing the top layer, where the flat tab is hingedly connected to the top layer to move the distal second surface away from the top layer for connection to the first coupling element;

wherein, when the monitor device is connected to the sensor patch, the flat tab of the sensor patch is inserted into the slot of the monitor device, and the locking element of the monitor device is rotated from the open position to the closed position to reduce a height of the slot and mechanically and electrically connect the flat tab of the sensor patch to the first interface of the monitor device.

19. The skin surface system according to claim 18, wherein the monitor device at the proximal end of the tail portion comprises a second coupling element and the monitor device comprises a third coupling element, where the second and third coupling elements comprise a second set of complementary shaped coupling elements adapted for electrically and mechanically detachably connecting the tail portion to the monitor device.

20. The skin surface system according to claim 18, wherein the first, second, third and fourth coupling elements are complementary shaped male and female coupling elements.

21. The skin surface system according to claim 18, wherein the one or more electrodes of the tail portion correspond to a number of electrodes of the sensor patch.

22. The skin surface system according to claim 18, wherein the flat tab of the sensor patch comprises a proximal first surface adapted to lie flat and planar relative to the top layer.

23. The skin surface system according to claim 18, wherein, when the monitor device is connected to the sensor patch, a portion of the monitor device is positioned between the distal second surface of the flat tab and the top layer of the sensor patch.

* * * * *